Sept. 2, 1958. H. F. BOHLMAN 2,849,913
EGG FEEDING AND CANDLING MACHINES
Filed Nov. 14, 1952 3 Sheets-Sheet 1
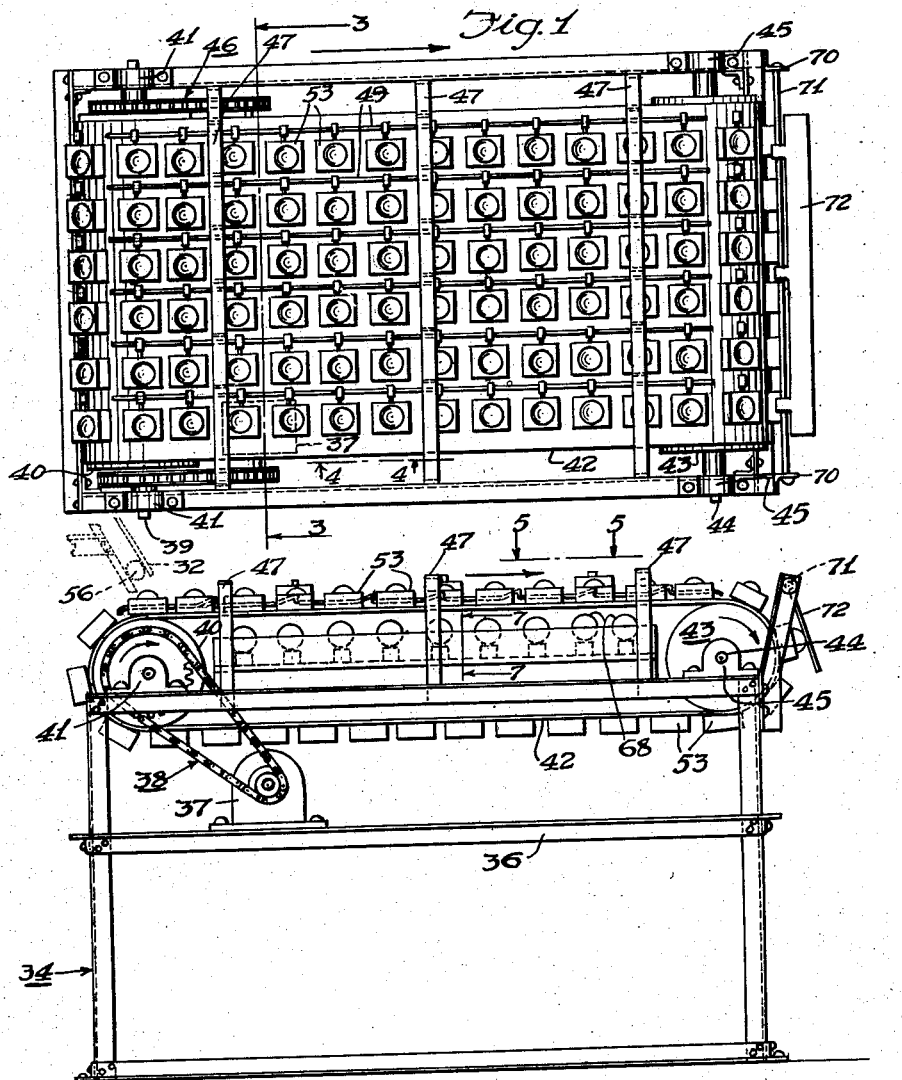
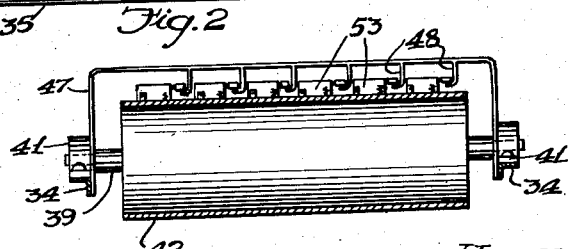
INVENTOR.
Herman F. Bohlman
BY H. G. Sanders
Attorney

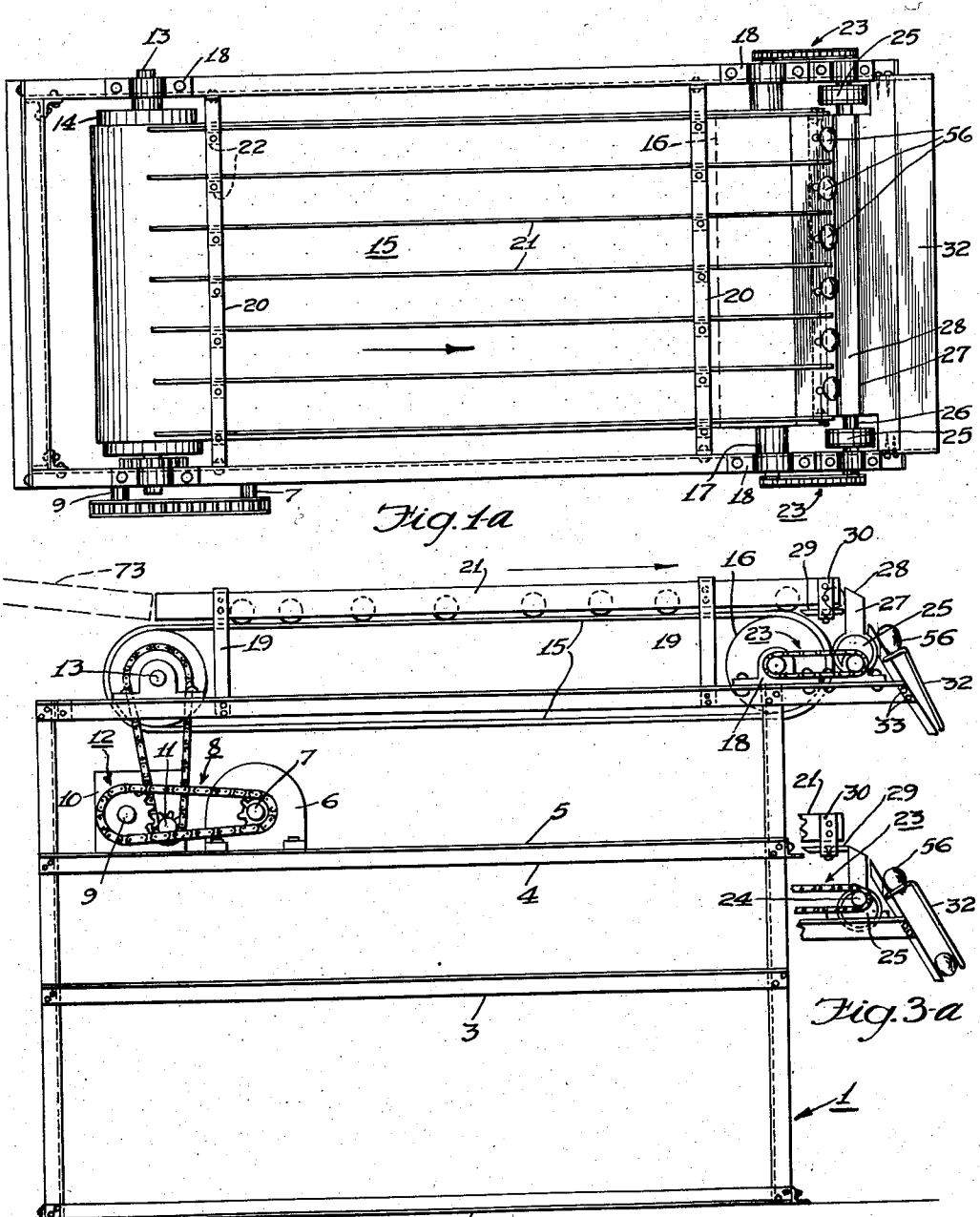

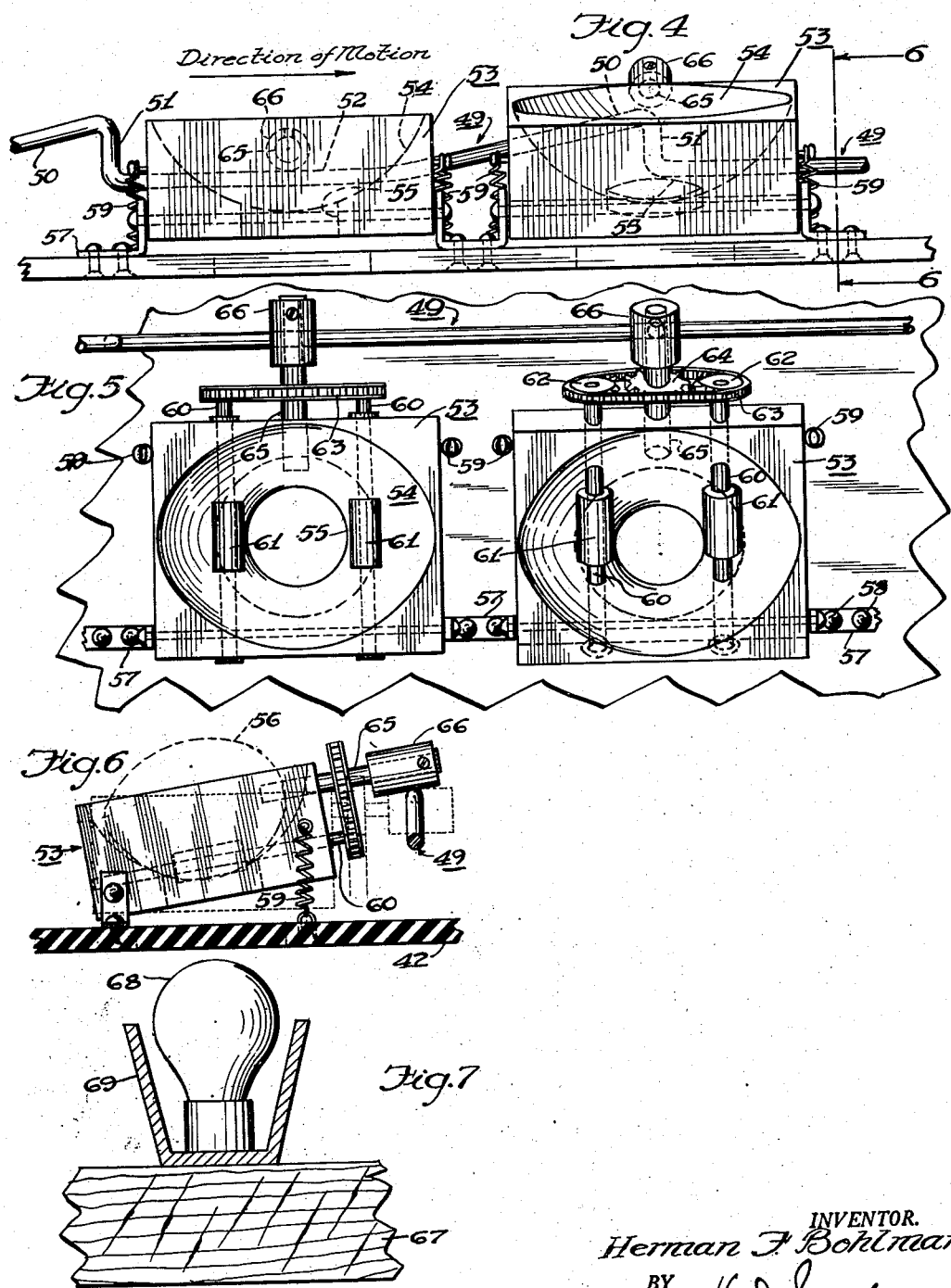

United States Patent Office 2,849,913
Patented Sept. 2, 1958

2,849,913
EGG FEEDING AND CANDLING MACHINES

Herman F. Bohlman, Chicago, Ill.

Application November 14, 1952, Serial No. 320,579

1 Claim. (Cl. 88—14.5)

This invention relates to automatic egg feeding and candling machines. One object is to provide egg candling means including a plurality of individual egg carrying units adapted to travel over a frame immediately above egg illuminating elements, the carrying units automatically adjustable in their travel to present the eggs at a variety of angles or positions enabling an attendant to view the eggs to the greatest advantage, to easily remove defectives and insuring an efficient candling job speedily and with negligible likelihood of damage to the merchandise.

A further object is to provide an egg feeding and candling machine of light weight, compact in assembly, durable in structure, sanitary in use, one wherein all parts are readily accessible for inspection and that is relatively inexpensive to manufacture.

Other and additional objects of the instant invention will be made apparent from the following description and claim and illustrated in the accompanying drawings which show a preferred form and what at present is considered the best mode in which I have contemplated applying the instant principle. Other embodiments of the invention comprising the same or equivalent principle may be used and structural changes may be made as desired, by those skilled in the art, without departing from the invention and the purview of the appended claim.

In the drawings:

Fig. 1a is a top plan view of the feeder machine per se.

Fig. 2a is a view of the feeder in side elevation, a portion of a gravity feed table being shown.

Fig. 3a is a fragmentary end elevational view of Fig. 2a showing the drop gate in altered position.

Fig. 1 is a top plan view of the candling machine.

Fig. 2 is a side elevational view of Fig. 1.

Fig. 3 is a vertical cross sectional view through Fig. 1 on the line 3—3.

Fig. 4 is an enlarged fragmentary side elevational view showing relative positions of two egg carriers or baskets at two points along the line of travel of same, taken substantially on the line 4—4 of Fig. 1.

Fig. 5 is a top plan view of Fig. 4, or a view on line 5—5 of Fig. 1.

Fig. 6 is an end elevational view, partly in section, taken on the line 6—6 of Fig. 4, and, Fig. 7 is an enlarged view, partly in section and partly in elevation, of one of the lamps employed, taken on line 7—7 of Fig. 2.

Referring now to Figs. 1a through 3a the feeder machine is shown wherein the reference numeral 1 denotes a desirably oblong frame supported upon a base 2, provided with brace rails 3, 4, the braces 4 supporting a platform 5 upon which a motor 6 is arranged the shaft 7 of which is connected by sprocket wheels and chain 8 to the shaft 9 of a speed reducer 10 the shaft 11 of which is connected by sprocket wheels and chain 12 to the shaft 13 of the roller 14 of the flexible transparent conveyor 15, the opposite roller 16 thereof having its shaft 17, like shaft 13, mounted in bearings 18 carried by said frame, vertical supports 19 rising from opposite sides of said frame are provided, the supports 19 of one frame side connected by horizontal bars 20 to the opposite side supports, said bars 20 supporting spaced parallel guide rails 21, extending longitudinally of said frame, by means of links 22.

The ends of shaft 17 are reduced and extended beyond the bearings 18 and connected by sprocket and chain connections 23 to stub shafts 24 mounted in bearings 18 carried by the frame, said stub shafts having fast thereupon eccentrically the small rotors 25, or cams, that carry the shaft 26 of the drop gate 27 that rises and falls slowly while the machine is in operation, the high position of said gate shown in Fig. 2a and the low position in Fig. 3a, said drop gate extending from side to side of said frame, the upper end 28 of said drop gate beveled downwardly and forwardly and in its lower position being in line with the horizontal step 29 in line with the conveyor 15 and secured by straps 30 to guide rails 21, said step receiving eggs, from said conveyor, that pass thereover and drop into and pass through the flexible chute 32 secured by rivets 33 to a frame extension and into the candler shown in Figs. 1 through 7. It will be noted that in the raised position of the drop gate, shown in Fig. 2a, it serves as an egg stop while in its lowered position it permits eggs to pass thereover and into the chute, the speed of the conveyor and of the drop gate being so timed that the eggs are spaced apart very slightly so that possible contact with each other will not cause damage.

Arranged immediately in advance of the frame 1 is the egg candling machine as shown in Figs. 1 through 7 of desirably lesser height and length than the frame 1, the candling machine having a frame 34 including a base 35 having braces 36 that support a motor and speed reducer 37 connected by sprocket wheels and chain 38 to the shaft 39 of the conveyor roller 40 journaled in bearings 41 supported by said frame, said roller 40 supporting one end of the flexible conveyor belt 42 that passes about conveyor roller 43 carried upon shaft 44 journaled in bearings 45 also arranged upon said frame. An auxiliary set of sprocket chain and wheels 46 upon the opposite side of said frame connects roller shaft 39 to the frame for ease of operation.

Secured at its ends to sides of the frame 34 are the spaced inverted U-shaped supports 47 that extend upwardly slightly above the conveyor and across same and carry depending fingers 48 that are secured to and carry a plurality of parallel regularly spaced wire strands 49 that extend from end to end of the frame above the conveyor belt 42, the ends of said wires being very slightly downturned, each wire bent to form, from left to right of the frame, a plurality of contorted upwardly inclined portions 50 merging into downwardly disposed drop portions 51 that merge into horizontal portions 52, these contorted portions continuing at regularly spaced intervals from end to end of the wires.

Carried by the conveyor belt 42 spaced equally one from the next are a plurality of individual egg carriers 53 arranged in endless parallel rows, each carrier of substantially oblong shape, the top face of each formed with a beveled portion 54 terminating in an approximately round perforation 55, the size and shape of said beveled portion with said perforate portion being slightly larger than that of an ordinary egg 56 which may be fairly snugly received therein as shown in Fig. 6. The carriers have their longer sides parallel to said wires 49, the shorter sides of said carrier adjacent one of its longer sides being pivotally secured to U-shaped brackets 57, each bracket connecting two carriers and being fastened by rivets 58 securely to the conveyor belt. Each of the shorter, or end, faces of a carrier remote from said brackets is connected by a contractile coil spring 59 secured to said conveyor belt to yieldingly pull said carrier toward same or downwardly.

Extending completely through the longer side of each carrier parallel to the shorter faces are the rotary shafts 60 each having fast thereupon, contiguous to the carrier perforation, a rubber roller 61, said shafts extending beyond each carrier and having fast thereon sprockets 62 connected by sprocket chain 63 which, together with said sprockets 62 is in mesh with a sprocket 64 fast upon shaft 65 of the carrier, said shaft 64 having fast thereupon the hard rubber roller 66 that travels over a wire strand 49 which roller 66 through its connections imparts a rocking or tilting movement to the carrier, as said roller passes over the variously disposed portions of said wire, said roller 66 also imparts rolling movement to the rollers 61 which turn eggs deposited thereon as roller 66 causes said rollers 61 to turn through the intermediation of said sprockets 62 and 64, and chain 63.

Arranged upon a platform 67 above the top level of the frame between the upper and lower planes of the conveyor is a platform supported by said frame and carrying a plurality of lamps 68 in sockets 69, said lamps in line with the carrier perforations as the carriers pass thereover as they move with the conveyor belt. Carried by brackets 70 at one end of the frame is a rod 71 that pivotally carries the flexible shaft 72 extending transversely of the frame contiguous to the egg carriers so that eggs carried thereby may ride into engagement with the flap, the eggs after passage beyond said flap dropping, through gravity, out of said carriers and into a container such as a grader provided in position to receive the eggs.

The eggs that move upon the feeder come from a conventional inclined gravity table or feed table 73, or board, which is positioned adjacent the rear end of the feeder, as shown in Fig. 2a, or attached to the end of the instant machine, so that the eggs will roll upon the flexible conveyor 15 between the guide rails 21 and be moved forwardly as previously described. As the eggs are received in the carriers 53 they are nested therein contiguous to or in line with the carrier perforations 55 just above the lamps 68 which illuminate or candle them so that the attendant may readily observe their condition and easily remove defectives.

What is claimed is:

In an egg feeding and candling machine, a frame, a conveyor carried thereby, perforate egg carriers pivotally carried by said conveyor, illuminating means carried by said frame beneath said carriers, wires extending longitudinally of said frame formed with spaced contorted portions, and carrier adjusting and supporting means carried by said conveyor and including a roller travelling over said wires and over said contorted wire portions for actuating said carriers.

References Cited in the file of this patent

UNITED STATES PATENTS

| | | |
|---|---|---|
| 1,429,092 | Paranteau | Sept. 12, 1922 |
| 1,483,660 | Grubb | Feb. 12, 1924 |
| 1,663,704 | Holzmann | Mar. 27, 1928 |
| 2,186,196 | Haugh | Jan. 9, 1940 |
| 2,497,655 | Bramson | Feb. 14, 1950 |
| 2,531,292 | Page | Nov. 21, 1950 |
| 2,536,250 | Archer | Jan. 2, 1951 |